(12) United States Patent
Peterson et al.

(10) Patent No.: US 12,523,800 B2
(45) Date of Patent: Jan. 13, 2026

(54) BAFFLE AND SHUTTER ASSEMBLY FOR EXTREME ENVIRONMENT

(71) Applicant: Eagle Technology, LLC, Melbourne, FL (US)

(72) Inventors: Ian D. Peterson, Rochester, NY (US); James A. Throckmorton, Rochester, NY (US); Christopher Sullivan, Rochester, NY (US); Andrew Bucossi, Irondequoit, NY (US)

(73) Assignee: Eagle Technology, LLC, Melbourne, FL (US)

( * ) Notice: Subject to any disclaimer, the term of this patent is extended or adjusted under 35 U.S.C. 154(b) by 527 days.

(21) Appl. No.: 18/154,268

(22) Filed: Jan. 13, 2023

(65) Prior Publication Data

US 2024/0241294 A1 Jul. 18, 2024

(51) Int. Cl.
*G02B 5/00* (2006.01)
*G02B 17/06* (2006.01)
*G02B 23/16* (2006.01)

(52) U.S. Cl.
CPC ............. *G02B 5/006* (2013.01); *G02B 23/16* (2013.01); *G02B 17/061* (2013.01)

(58) Field of Classification Search
CPC ....... G02B 5/006; G02B 23/16; G02B 17/061

USPC .......................................................... 359/227
See application file for complete search history.

(56) References Cited

U.S. PATENT DOCUMENTS

| | | | |
|---|---|---|---|
| 4,217,026 A | 8/1980 | Radovich | |
| 5,189,554 A | 2/1993 | Vanasse et al. | |
| 2017/0168276 A1* | 6/2017 | Johnson | F41G 3/06 |
| 2020/0278552 A1* | 9/2020 | Lemoff | G02C 7/086 |
| 2021/0333446 A1* | 10/2021 | Mueller | G02B 26/023 |

* cited by examiner

*Primary Examiner* — William R Alexander
*Assistant Examiner* — Mackenzi Waddell
(74) *Attorney, Agent, or Firm* — Fox Rothschild LLP; Carol E. Thorstad-Forsyth (57) ABSTRACT

Baffle and shutter assembly (BSA) includes a baffle defined by a tubular member having a proximal end, a distal end, and a lumen extending therethrough. A baffle cover disposed at the distal end extends across a major aperture defined by the lumen and includes a cover aperture. A shutter system disposed within the lumen includes a shutter panel having a shutter aperture, and a shutter door. A door distal surface faces the baffle cover when the door is closed and has a reflective coating. The baffle cover has a cover proximal surface which faces toward the shutter system and is highly absorptive of electromagnetic energy in the optical spectrum.

12 Claims, 6 Drawing Sheets

BAFFLE AND SHUTTER ASSEMBLY FOR EXTREME ENVIRONMENT

BACKGROUND

Statement of the Technical Field

The technical field of this disclosure concerns optical systems, and more particularly optical systems including a baffle and shutter system for use in extreme environmental conditions.

Description of the Related Art

The related art concerns methods and systems involve optical telescope systems and assemblies which utilize one or more of a baffle and a shutter to control incoming light. An example of a telescope system which may use a baffle and/or shutter assembly can include a Cassegrain reflector telescope. Telescopes of this type often include a primary mirror (M1) which is concave and a secondary mirror (M2) which is convex. The primary mirror and the secondary mirror are maintained in spaced apart relationship by a metering structure. The primary mirror can include an aperture or opening in its center through which reflected light from the secondary mirror is directed to a focal plane. One or more of a baffle and a shutter can be disposed at or near the aperture in the primary mirror. The purpose of the baffle is to minimize the occurrence of stray light entering through the aperture. The purpose of the shutter mechanism includes closure or covering of the aperture when necessary to prevent light from passing to the focal plane. Other types of optical systems may also make use of baffles and shutter systems.

Certain evolving applications for baffle and shutter systems can be exposed to extreme environmental conditions. For example, exposure to high intensity electromagnetic energy in the optical spectrum can result in thermal effects which are potentially damaging to the shutter and/or baffle system. In such applications, it can be challenging to facilitate the necessary baffle and shutter functions while managing these thermal effects, particularly where size and weight constraints are a major design consideration.

SUMMARY

This document concerns a baffle and shutter assembly (BSA). The BSA comprises a baffle which is formed of a tubular member having a proximal end, a distal end, and a lumen extending therethrough along a central axis. A baffle cover is disposed at the distal end of the tubular member. The baffle cover extends across a major aperture of the tubular member defined by the lumen. A cover aperture defines an opening formed in the baffle cover, said opening being smaller than the major aperture. A shutter system is disposed within the lumen intermediate of the proximal end and the distal end of the tubular member. The shutter system includes a shutter panel extending across the major aperture. A shutter aperture of approximately the same size as the cover aperture, extends through the shutter panel and is aligned with the cover aperture.

The shutter system also includes a door movable between a closed condition in which the door is positioned to prevent light from passing through the shutter aperture, to an open condition in which the door is positioned to permit light to pass through the shutter aperture. The door has a door distal surface which faces the baffle cover when the door is in the closed condition. The door distal surface has a reflective coating which is highly reflective of electromagnetic energy in the optical spectrum. The baffle cover has a cover proximal surface which faces toward the shutter system and is highly absorptive of electromagnetic energy in the optical spectrum. According to one aspect, the cover proximal surface has an absorptance of at least 90%. In some scenarios, the cover proximal surface includes a cover proximal surface coating comprised of a material which is highly absorptive of electromagnetic energy in the optical spectrum.

In some embodiments, the BSA can include a second cover aperture, a second shutter aperture extending through the shutter panel aligned with the second cover aperture, and a second door movable between the open and closed position.

The shutter panel includes a panel distal surface facing the baffle cover. The panel distal surface has a reflective coating which is highly reflective of electromagnetic energy in the optical spectrum. The baffle cover is configured to function as a thermal sink for the shutter system by absorbing electromagnetic energy in the optical spectrum which has been reflected from the shutter panel distal surface and the door distal surface. To facilitate this function, the baffle cover is advantageously comprised of a polymer or composite material having a Tg value of at least 500° F. In some scenarios, the baffle cover is comprised of a cyanate ester.

According to one aspect, the tubular member, the shutter panel and the door can also be comprised of the polymer or the composite material. Further, the baffle cover can be thermally coupled to the tubular member at the distal end of the tubular member. The thermal coupling can help to distribute thermal energy absorbed in the baffle cover. The baffle cover has a cover distal surface which faces away from the shutter system. This cover distal surface advantageously has a cover reflective coating which is highly reflective of electromagnetic energy in the optical spectrum.

The present disclosure also concerns a method for managing thermal energy in a BSA. The method can involve receiving electromagnetic energy in the optical spectrum at a baffle defined by a tubular member having a proximal end, a distal end, and a lumen extending therethrough along a central axis. The method can further involve limiting the entry of the electromagnetic energy into the lumen by using a baffle cover disposed at the distal end and extending across a major aperture defined by the lumen and having a cover aperture in the baffle cover which is smaller in diameter as compared to the major aperture. Finally, an amount of light that is allowed to pass through the lumen is controlled by using a shutter system disposed within the lumen intermediate of the proximal end and the distal end. The shutter system can be similar to the shutter system described above. As such, the shutter system may comprise a shutter panel extending across the major aperture, a shutter aperture extending through the shutter panel, and a door. The door can be movable between a closed condition in which the door is positioned to prevent light from passing through the shutter aperture, to an open condition in which the door is positioned to permit light to pass through the shutter aperture. The method further involves using a highly reflective door distal surface which faces the baffle cover when the door is in the closed condition to reflect incident electromagnetic energy in the optical spectrum toward a cover proximal surface of the baffle cover which is highly absorptive of the incident electromagnetic energy. In this way, the incident electromagnetic energy is substantially absorbed by the baffle cover instead of the shutter system.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

The methods and/or systems disclosed herein may provide certain advantages in an optical assembly or system, such as a telescope. Primary mirror baffles in optical assemblies can be bonded structures which are manufactured using carbon fiber reinforced polymer (CFRP). Baffle and shutter assemblies capable of withstanding increasingly high temperatures associated with certain space-based mission applications can be constructed using titanium and machinable ceramic. However, these metal and/or machinable ceramic solutions are relatively heavy and therefore not well suited for space-based applications.

Accordingly, an improved light-weight optical assembly is provided with a baffle and shutter assembly (BSA) capable of operating in harsh thermal environments. An optical system including the BSA incorporates various design features which help direct, store and/or dissipate thermal energy. These features allow the BSA and the optical system in which it is incorporated to operate in challenging thermal environments. For example, the solutions described herein can help facilitate an optical telescope system that is well-suited for use in certain space applications.

Figure 1:
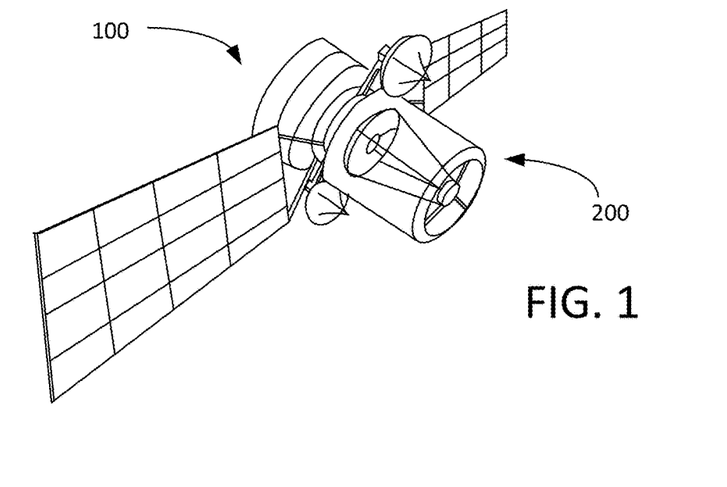
FIG. 1 depicts an exemplary optical telescope system which is useful for understanding certain aspects of a solution described herein.
Figure 2:
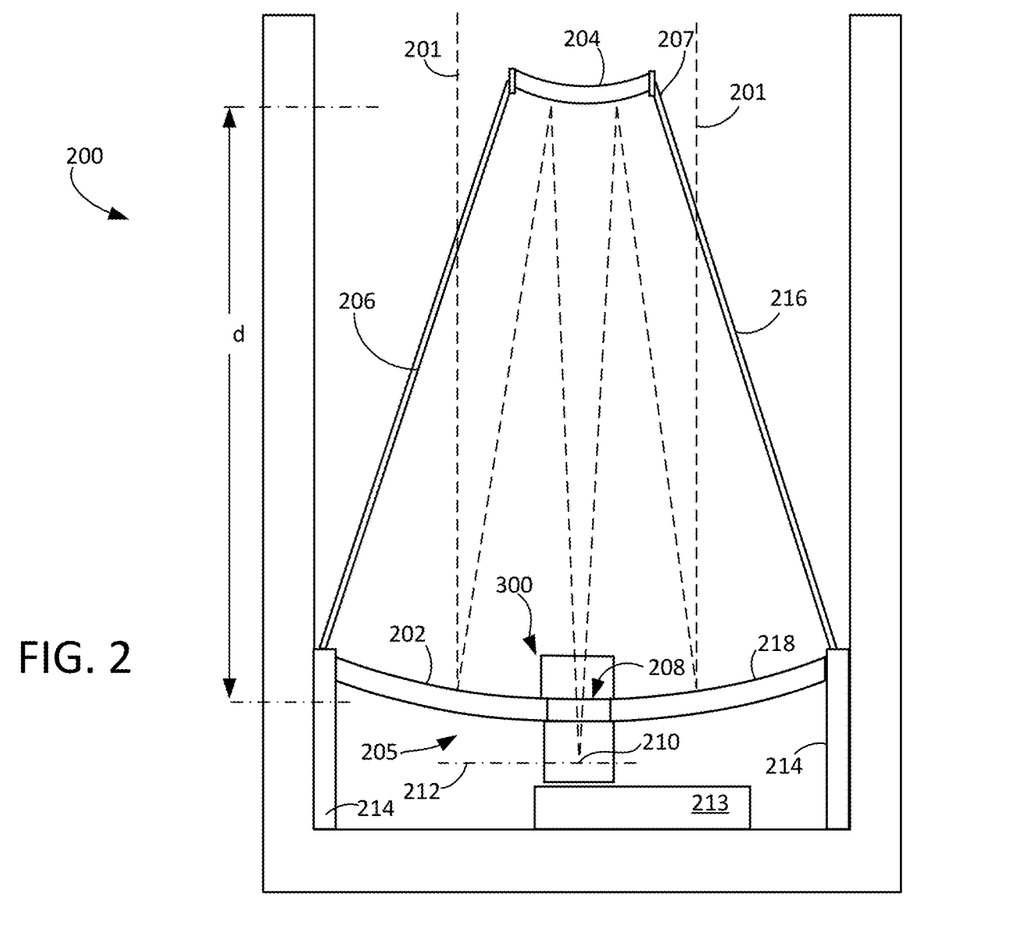
FIG. 2 is a schematic drawing that is useful for understanding certain elements of an optical system which includes a baffle and shutter assembly (BSA).

An exemplary telescope system 100 shown in FIG. 1 includes an optical assembly 200 which can be used for observing or collecting images of a subject. A schematic representation of the optical assembly 200 is shown in FIG. 2. In the example shown, the optical assembly 200 is a Cassegrain type of telescope system which includes a primary mirror 202 at a proximal end 205 of the optical assembly 200 and a secondary mirror 204 at a distal end 207 of the optical assembly 200. However, it should be understood that the solution is not limited to Cassegrain types of telescopes or telescopes systems generally. Instead, the optical assembly can be any type of optical system, including laser systems.

Cassegrain type telescope systems are well-known and therefore will not be described here in detail. However, a brief description of the telescope system 100 is provided to facilitate an understanding of certain aspects of the disclosure herein. The primary mirror 202 and the secondary mirror 204 are maintained in predetermined positions spaced apart a distance d by metering structure 206. The primary mirror 202 is configured to reflect incoming light 201 toward the secondary mirror 204. The primary mirror 202 has an aperture 208 which may be formed in a center of the primary mirror 202. The secondary mirror 204 is configured to direct light reflected by the primary mirror 202 through the opening defined by the aperture 208 toward a focal point 210 disposed in a focal plane 212. In some scenarios, an imaging system 213 can be disposed within the optical assembly to capture images which appear at the focal plane 212 as a result of the operation of the primary mirror 202 and the secondary mirror 205. The imaging system is beyond the scope of this disclosure, but it should be understood that the imaging system 213 can include one or more lenses, mirrors, and optical filters. The imaging system 213 can also include at least one electronic imaging device suitable for capturing images.

The metering structure 206 can include a base 214 which may provide support for the primary mirror 202. One or more struts 216 can extend from the base 214 to the secondary mirror 204. The one or more struts 216 can be fixed at opposing ends to the base and to a collar surrounding the secondary mirror. Consequently, the struts 216 cab be sufficient to maintain the primary mirror 202 and the secondary mirror 204 in fixed positions spaced apart by distance d.

The optical assembly can also include a BSA 300 associated with the primary mirror 202. The BSA 300 in this example is disposed on a distal face 218 of the primary mirror 202 and extends in a direction toward the secondary mirror 204. However, the solution is not limited in this regard and a BSA as described herein can be disposed in other locations in different optical systems. According to one aspect, the BSA 300 incorporates a combination of thermal management features which direct, store and/or dissipate thermal energy to advantageously facilitate operation of the BSA at high temperatures.

Figure 3A:
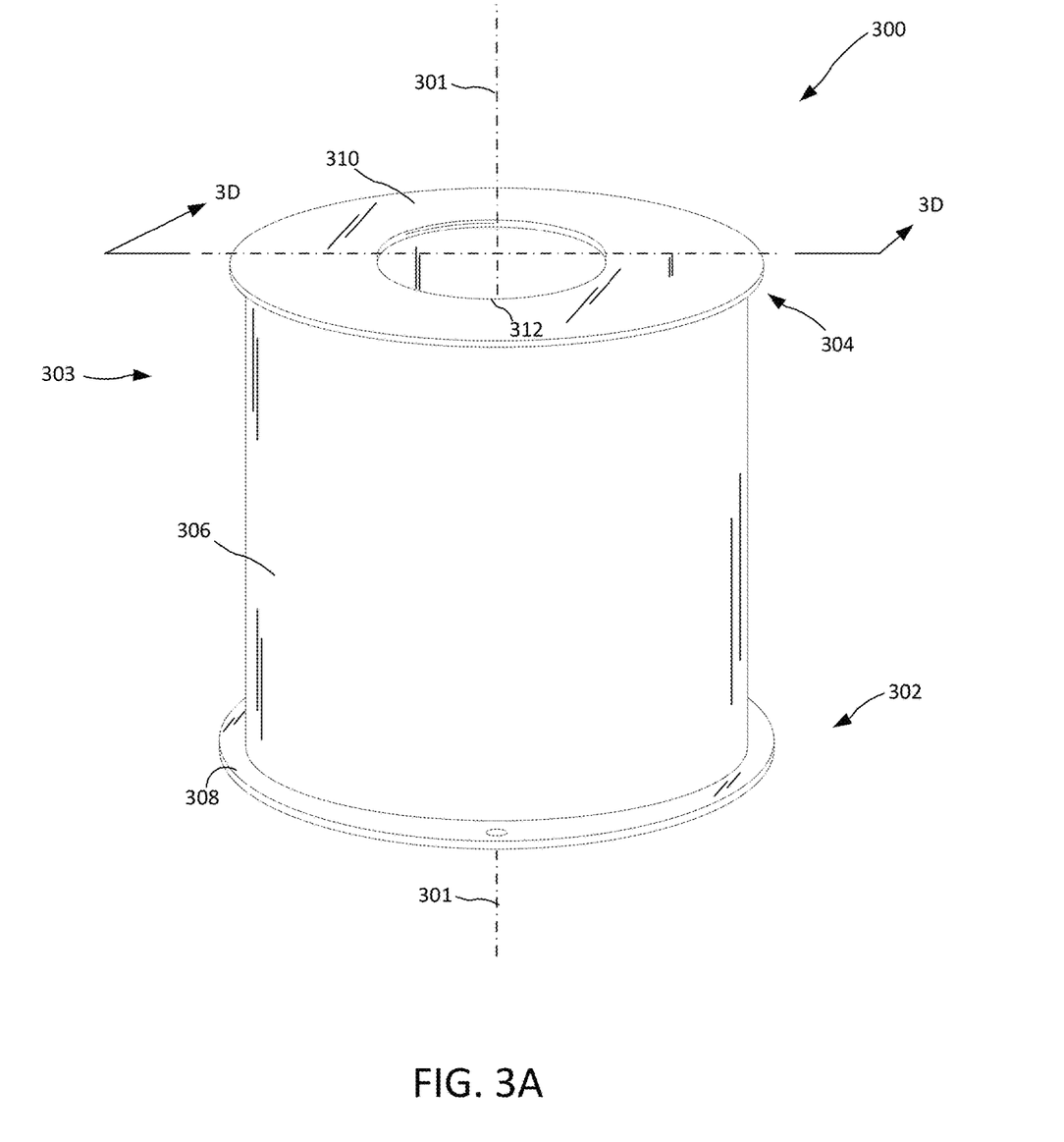
FIG. 3A depicts a side perspective view of a BSA that is useful for understanding one or more embodiments disclosed herein.
Figure 3B:
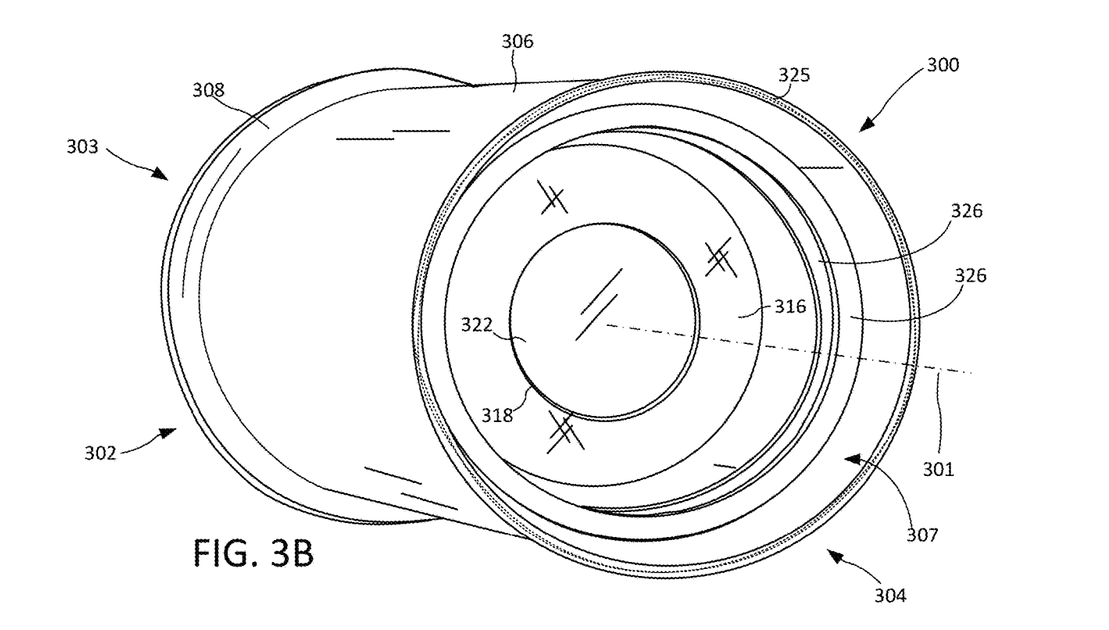
FIG. 3B depicts a front perspective view of the BSA of FIG. 3A with a baffle cover removed that is useful for understanding one or more embodiments disclosed herein.
Figure 3C:
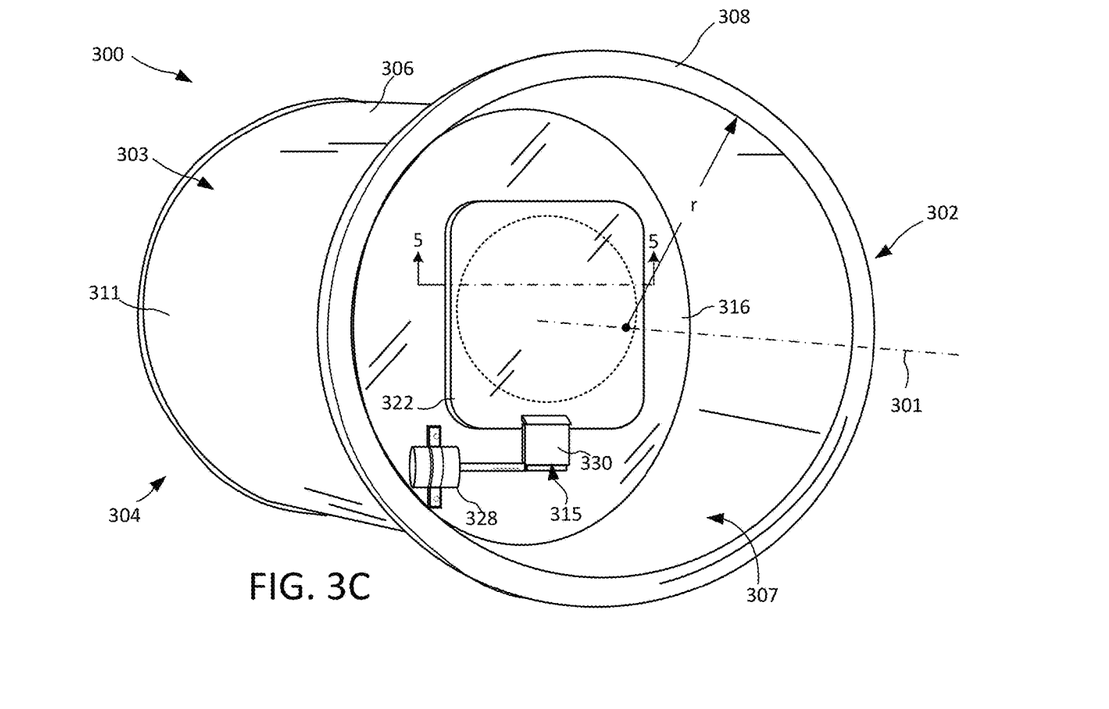
FIG. 3C depicts a rear perspective view of the BSA of FIG. 3A that is useful for understanding one or more embodiments disclosed herein.
Figure 3D:
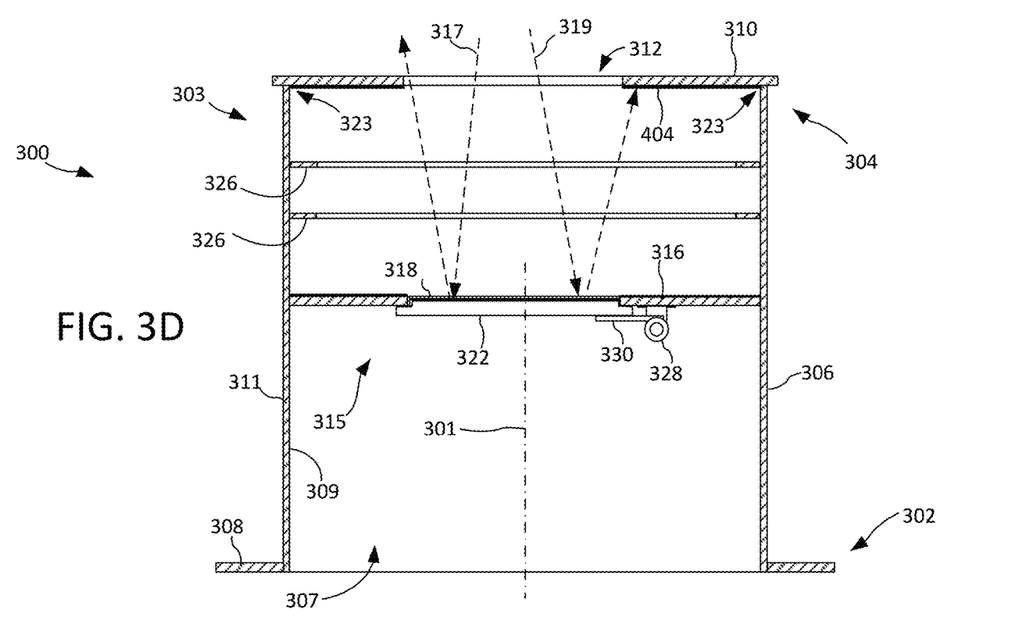
FIG. 3D depicts a cross-sectional view of the BSA of FIG. 3A with the shutter door closed, taken along line 3D-3D in FIG. 3A.
Figure 3E:
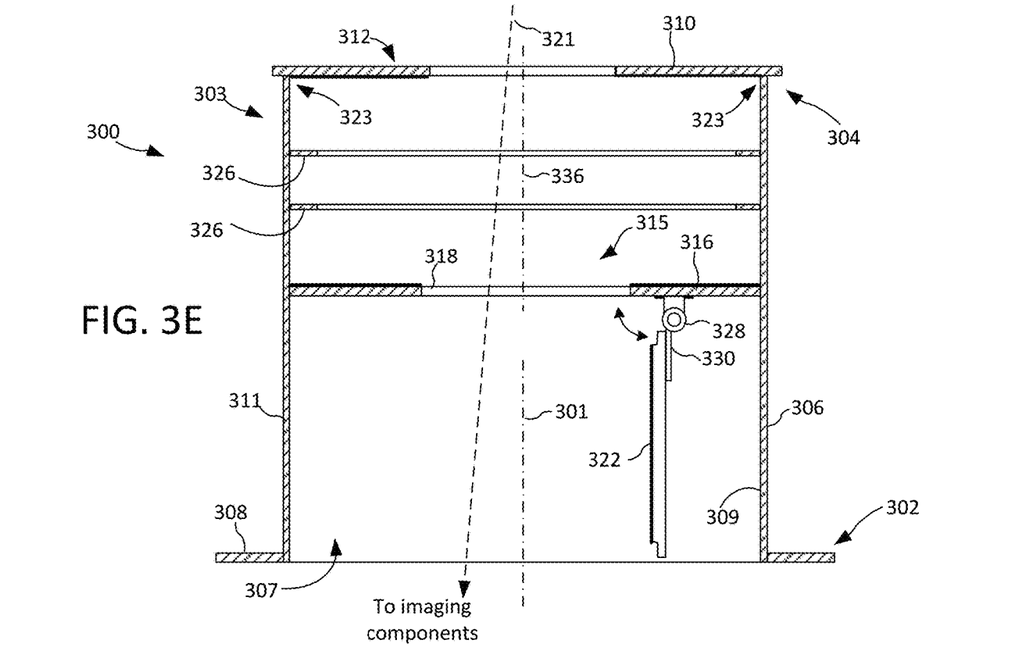
FIG. 3E depicts a cross-sectional view of the BSA of FIG. 3A with the shutter door open, taken along line 3D-3D in FIG. 3A.

FIG. 3A depicts a side perspective view of the BSS, FIG. 3B depicts a front perspective view of the BSA with a baffle cover removed, FIG. 3C depicts a rear perspective view of the BSA. FIG. 3D depicts a cross-sectional view of the BSA with the shutter door closed, taken along line 3D-3D in FIG. 3A and FIG. 3E depicts a cross-sectional view of the BSA with the shutter door open.

The BSA includes a baffle 303 which functions to control or limit the negative effects of stray light in the optical system. As used herein, the term stray light refers to electromagnetic radiation within the optical spectrum that is unwanted and interferes with the performance or intended function of the optical system. Electromagnetic radiation in the optical spectrum can include light in the ultra-violet, visible and/or infrared range of the electromagnetic spectrum. Stray light originating from bright objects near a field of view (FOV) of an optical sensing system is undesirable as it can be a significant noise source for imaging faint objects. In some scenarios, stray light can be caused by unwanted light which scatters and reflects off the metering structure of the optical system. In certain embodiments described herein, the baffle can also house a shutter mechanism.

The baffle 303 can be comprised of a cylindrical or conical shaped tubular member 306 which extends along a main axis 301 from a proximal end 302 to a distal end 304. The baffle 303 is secured in the optical system at a location where it can limit the occurrence of stray light entering the imaging system 213.

The tubular member 306 can include a support base 308 which facilitates attachment of the baffle 303 in its position within the optical system. In some scenarios the support base can comprise a flange which extends from a periphery of the wall 311 in a radial direction away from the main axis 301. In the Cassegrain embodiment shown in FIG. 2, the support base 308 can include mounting structure (not shown) which facilitates attachment of the baffle to the primary mirror 202. However, it should be understood that a BSA 300 can be used in various different types of optical systems and the Cassegrain embodiment of FIG. 2 is presented as merely one possible example.

A lumen 307 having a radius r is defined in the tubular member so that it extends along the main axis 301. The lumen is limited by an inner surface 309 of wall 311 which defines the tubular member 306. The lumen 307 forms a part of an opening in the baffle 303 through which light may pass to the imaging system 213. The lumen 307 is configured to allow light from subject matter of interest to pass through the aperture 208 while also limiting or reducing the amount of stray light which enters the aperture. In some scenarios, the inner surface of the lumen can be coated with a material that is highly absorptive of electromagnetic radiation in the optical spectrum. The absorptive coating can be useful for reducing the occurrence of stray light within the baffle. The tubular member 306 and/or the lumen 307 can have a substantially circular cross section. But embodiments of a baffle disclosed herein are not limited in this regard. For example, in some scenarios, the tubular member 306 and/or lumen 307 can have a cross-sectional profile which is square, rectangular, or oval shaped.

The lumen can comprise one or more internal structures which can be configured to reduce the occurrence of stray light and scattering within the tubular member. For purposes of this disclosure, the exact type of internal structure is not critical, but in some scenarios such structure can include one or more vanes 326. The use of vanes is well-known in the art of baffles and therefore will not be described in detail. However, it should be understood that the vanes can comprise structures which are circumferentially disposed on the inner surface 309 of the tubular member 306. In some scenarios, one or more of the vanes 326 can be comprised of an annular disc which extends radially inward a predetermined distance from the inner surface 309 of the tubular member 306 toward the main axis 301 of the tubular member. The predetermined distance will generally be much smaller as compared to a radius r of the lumen 307 about the axis 301 so that the vanes do not substantially obstruct the passage of light through the lumen. In the embodiments shown herein, only two such vanes 326 are shown. However, it should be understood that more or fewer vanes can be used in a baffle as described herein. The vanes 326 can be axially distributed along the length of the tubular member 306 at predetermined locations to reduce light scattering within the baffle. In some scenarios, the vanes can have a surface finish which is highly absorptive of electromagnetic radiation in the optical spectrum.

Figure 4A:
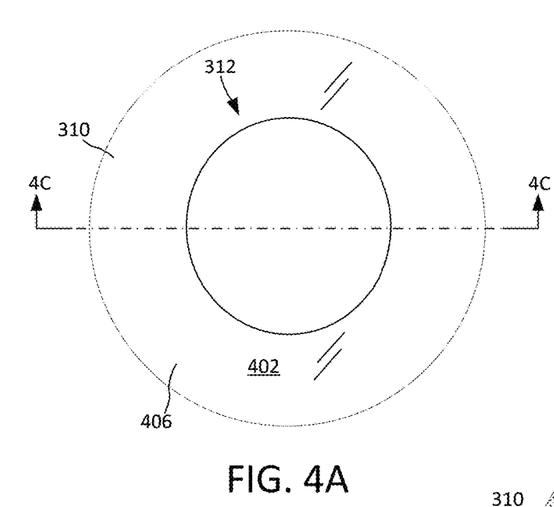
FIG. 4A depicts a front view of a baffle cover that is useful for understanding one or more embodiments disclosed herein.
Figure 4B:
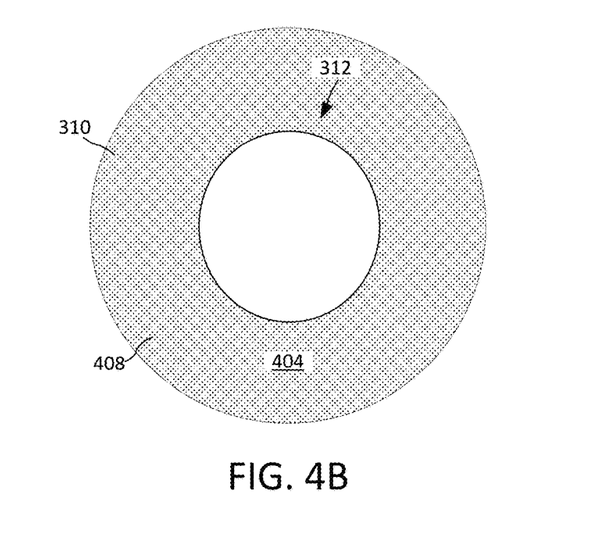
FIG. 4B depicts a rear view of the baffle cover that is useful for understanding one or more embodiments disclosed herein.
Figure 4C:
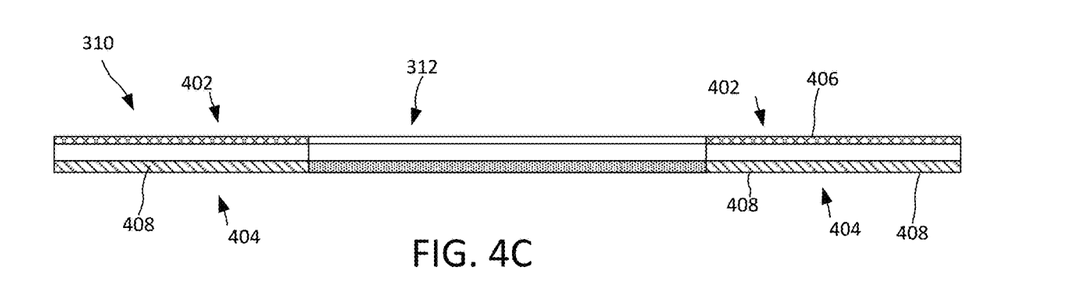
FIG. 4C depicts a cross-sectional view of the baffle cover of FIG. 4A, taken along line 4C-4C.

A baffle cover 310 can be disposed at the distal end 304 of the tubular member 306 to partially enclose the lumen 307. A front view of an exemplary baffle cover 310 is shown in FIG. 4A, a rear view of the baffle cover 310 is shown in FIG. 4B, and a cross-sectional view of the baffle cover is shown in FIG. 4C. The baffle cover 310 can have a distal surface 402 which faces away from an interior of the tubular member 306 and a proximal surface 404 which faces toward an interior of the tubular member 306. The baffle cover 310 can include one or more cover apertures (e.g., cover aperture 312). The one or more cover apertures may define one or more openings of the same or different size for allowing a predetermined amount of light to enter into the baffle 303.

The baffle cover 310 is secured to the tubular member 306 at the distal end 304 of the tubular member. The attachment of the baffle cover 310 to the tubular member 306 can be facilitated by any suitable means. In some scenarios an adhesive or bonding agent 325 can be used for this purpose. The adhesive or bonding agent can be applied at the interface 323 between the distal end 304 of the tubular member and the proximal surface 404 of the baffle cover. According to one aspect, the interface 323 can be configured to facilitate a high efficiency thermal coupling between the baffle cover 310 and the tubular member 306. For example, in some scenarios the adhesive or bonding agent 325 can be thermally conductive to facilitate transfer of thermal energy.

The baffle cover 310 incorporates certain features which advantageously facilitate operation of the BSA 300 in harsh thermal environments. These features help direct, store and/or dissipate thermal energy. For example, a distal cover coating 406 can be applied to the distal surface 402 of the baffle cover. The distal cover coating 406 is advantageously selected to be highly reflective of electromagnetic radiation in the optical spectrum. As used herein, the term optical spectrum can include optical energy in one or more of the infrared, visible and ultraviolet ranges. In some embodiments, the distal cover coating 406 can be optimized for reflecting optical energy in the infrared range so as to minimize thermal energy absorption. According to one aspect, the highly reflective coating applied to the distal surface 402 can be an electrochemically deposited coating comprised of gold. Gold has excellent reflectivity in the infrared spectrum and has high resistance to oxidation and corrosion. An example of such a coating is commercially available under the trade name Laser Gold® from Epner Technology, Inc. of Brooklyn, N.Y. Of course, other high reflectivity coatings are also possible, and embodiments are not limited to the gold coating described here.

The proximal surface 404 of the baffle cover 310 can advantageously have a surface finish which causes the proximal surface to be highly absorptive of electromagnetic radiation within the optical spectrum. In some scenarios, the surface finish on the proximal surface 404 can be facilitated by one or more material components which are integrated into a material comprising the baffle cover 310. For example, the surface properties can be facilitated by fillers, additives, compounds, and/or dyes which are added to a material forming the baffle cover. The integrated materials can result in the proximal surface 404 having a surface finish produced by the integral components which facilitates absorption of electromagnetic radiation in the optical spectrum. Alternatively, the material comprising the proximal surface 404 can support a proximal cover coating 408 on its surface to facilitate a desired surface finish. A proximal cover coating 408 which is used with the proximal surface 404 can be comprised of a material that is highly absorptive of electromagnetic radiation in the optical spectrum.

For purposes of this disclosure, a coating that is highly absorptive can be understood to include one which has an absorptance of at least 90%. In some scenarios, the coating can be highly absorptive of light in one or more of the visible, infrared and/or ultraviolet spectrum. For example, a highly absorptive coating material can be one of a class of super-black coatings which have total hemispherical reflectance (THR) below 1.5% in the visible spectrum. An example of such a material is a line of products offered under the brand name Vantablack® by Surrey NanoSystems Limited of the United Kingdom. Vantablack® is available as a sprayable paint that uses randomly aligned carbon nanotubes. These products facilitate very high levels of absorption of optical energy in the range from ultraviolet to the terahertz portion of the spectrum.

A shutter system 315 is disposed within the tubular member 306 intermediate of the proximal end 302 and the distal end 304. The shutter system 315 is comprised of a shutter panel 316 which extends across the opening defined by the lumen 307. The shutter panel 316 can extend radially inwardly from the inner surface 309 of wall 311 toward the main axis 301. As such, the shutter panel 316 can extend in a direction perpendicular to the main axis. The shutter panel 316 defines one or more shutter panel apertures (e.g., shutter panel aperture 318). The shutter panel aperture extends through the shutter panel to form an opening therein. The shutter panel aperture (e.g., apertures 318) can be axially aligned with a corresponding cover apertures. For example, shutter panel aperture 318 can be aligned with cover aperture 312 along an aperture axis 336. In some scenarios, the size and/or shape of an opening defined by the shutter panel aperture 312 can be chosen to correspond respectively to the size and/or shape of an axially aligned cover aperture. For example, the size and/or shape of the shutter panel aperture 318 can correspond with the size/shape of the cover aperture 312.

Each shutter panel aperture (e.g., shutter panel aperture 318) can include a door (e.g., door 322) which is configured to allow the opening formed by the shutter panel aperture to be selectively opened and closed. The position of the door 322 can be controlled by one or more motors (e.g., motor 328) configured to cause the door for the aperture to turn on one or more hinges (e.g., hinge 330). In some scenarios, the motor can be comprised of an electric motor, but the solution is not limited in this regard. For example, in some applications, a hydraulic motor, pneumatic actuator, or other suitable motor type can be used for this purpose. A suitable drive shaft or drive linkage can be used to couple the motor to the hinges. With the motor and linkage arrangement as described herein, the door (e.g., door 322) associated with the shutter panel aperture (e.g., shutter panel aperture 318)) can be automatically transitioned between a closed position shown in FIG. 3D and an open position shown in FIG. 3E.

When door 322 is in a closed position shown in FIG. 3D, light entering the baffle 303 is blocked from passing through the shutter panel aperture 318. The foregoing function of doors 322 is illustrated in FIG. 3D which shows light ray 317 prevented from passing through the shutter panel aperture. Conversely, when door 322 is in an open position shown in FIG. 3E, light entering the baffle 303 is permitted to pass through the shutter panel aperture 318. This condition is illustrated by light ray 321 which is shown passing through the shutter panel aperture 318.

In FIGS. 3D and 3E only a single shutter door 322 is illustrated. However, as noted above, more than one shutter panel aperture and associated door can be provided. In such scenarios, the two or more doors associated with the separate apertures can operate independently. For example, shutter door 322 may be opened while a different door (not shown) is held closed, and shutter door 322 may be closed while the other door is open. A control system (not shown) can be used to selectively control the operation of one or more shutter door motors (e.g., shutter motor 328). In this way, the one or more doors can be controlled so that each may be opened or closed independently as needed to facilitate operation of the optical system. With the foregoing arrangement, the shutter door(s) can be used to selectively prevent light from passing to the focal plane of the optical system 213.

Figure 5:
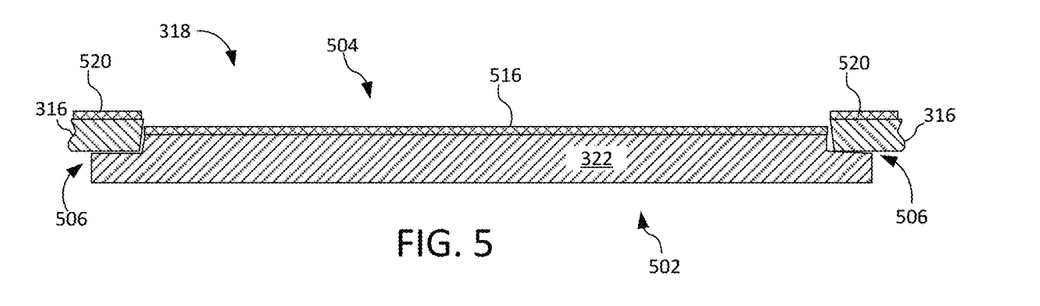
FIG. 5 depicts a cross-sectional view of a shutter door, taken along line 5-5 in FIG. 3C.

In FIG. 5 there is shown a cross-sectional view of door 322, taken along line 5-5 in FIG. 3C. The door 322 can have a proximal surface 502 and a distal surface 504. A ledge 506 formed on a peripheral edge of the door 322 can be provided to engage with a peripheral edge of the shutter panel apertures 318.

A highly reflective coating 516 can be applied to the distal surface 504 of each of the one or more door (e.g., door 322). When the door is closed, the highly reflective coating 516 will reflect electromagnetic energy in the optical spectrum. In some scenarios, the highly reflective coating 516 can be an electrochemically deposited coating comprised of gold. An example of such a coating is commercially available under the trade name Laser Gold® from Epner Technology, Inc. of Brooklyn, N.Y. Of course, other high reflectivity coatings are also possible, and embodiments are not limited to the gold coating described here. For example, in some embodiments a highly reflective coating can be formed of silver or aluminum. A similar highly reflective coating 520 can also be applied to the distal surface of the shutter panel 316.

In some scenarios, light which is reflected by the highly reflective coating 516 can pass directly out of the baffle 303 through a cover aperture 312. This concept is illustrated in FIG. 3D which shows light ray 317 being reflected and exiting through cover aperture 312. In this scenario, incident light is substantially rejected by being reflected away from the BSA 300 so as to minimize any absorption of thermal energy by the BSA 300. In other scenarios, light which is reflected from by a highly reflective coating 516 will be blocked from exiting the baffle by the baffle cover 310. This concept is illustrated in FIG. 3D which shows light ray 319 being reflected from the shutter door 322 so that it is incident on the proximal cover surface 404. In this scenario, the reflected electromagnetic energy in the optical range (e.g., light in the infrared range) will be absorbed at the proximal cover surface 404 (e.g., by proximal cover coating 408) and converted to heat. Optical energy which is incident on portions of the shutter panel 316 can be similarly reflected by highly reflective coating 520, and is absorbed by the cover panel as heat.

In the scenarios described herein, the baffle cover 310 advantageously functions as a heat sink for the thermal energy which is absorbed. The foregoing arrangement is advantageous in a BSA used under extreme thermal conditions. Thermal energy produced by light incident on the door (e.g., door 322) and/or panel 316 is absorbed as heat in the baffle cover 310 rather than heating the shutter system 315. This helps to reduce the accumulation of thermal energy in the shutter system 315 and thereby protects the more delicate and sensitive components of the shutter system from the negative effects of extreme heating. In some scenarios, a portion of the thermal energy which accumulates in the baffle cover 310 can be distributed to the tubular member 306 through the interface 323.

According to one aspect, one or more of the tubular member 306, the base 308, the cover 310, the shutter panel 316, the shutter door 322, and the hinge 330 can be formed of a lightweight metallic material such as titanium that is capable of withstanding high temperature. However, to facilitate operations of the BSA 300 at high temperatures while also reducing the overall weight of the BSA, it can be advantageous to instead use a high service temperature polymer or composite material to form one or more of the noted components. As used herein, a high service temperature can be understood to include a polymer or composite material having a glass transition temperature (Tg) exceeding about 500° F.

An example of a high temperature composite material which provides excellent thermal stability and can be used for the purposes described herein is a commercially available flow-controlled cyanate ester prepreg offered under the trade name TC420 by Toray Advanced Composites of Morgan Hill, California. Advantages of the TC420 product for the BSS is that it offers high temperature stability. Notably, the TC420 product is specified to have a Tg of 500° F. with a short-term capability extending to 600° F. Other types of high-temperature composite materials can also be used provided that they exhibit similar levels of thermal stability. Accordingly, embodiments are not limited to the particular materials listed above.

One example of a high temperature polymer that can be used for this purpose is a Polyimide plastic material. Polyimides have excellent thermal properties and exhibit long-term thermal stability at temperatures up to and exceeding 600° F.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A baffle and shutter assembly (BSA), comprising:
a baffle defined by a tubular member having a proximal end, a distal end, and a lumen extending therethrough along a central axis;
a baffle cover disposed at the distal end of the tubular member so as to extend across a major aperture defined by the lumen and having a cover aperture smaller than the major aperture formed therein; and
a shutter system disposed within the lumen intermediate of the proximal end and the distal end, the shutter system comprising a shutter panel extending across the major aperture, a shutter aperture extending through the shutter panel aligned with the cover aperture, and a door movable between a closed condition in which the door is positioned to prevent light from passing through the shutter aperture, to an open condition in which the door is positioned to permit light to pass through the shutter aperture;
wherein the door has a door distal surface which faces the baffle cover when the door is in the closed condition, the door distal surface has a reflective coating which is highly reflective of electromagnetic energy in the optical spectrum, and the baffle cover has a cover proximal surface which faces towards the shutter system, wherein the cover proximal surface is highly absorptive of electromagnetic energy in the optical spectrum; and
wherein the door distal surface reflects incident electromagnetic energy in the optical spectrum towards the cover proximal surface of the baffle cover when the door is in the closed condition, whereby the incident electromagnetic energy is absorbed by the baffle cover.

2. The BSA of claim 1, wherein the shutter panel includes a panel distal surface facing the baffle cover and has a reflective coating which is highly reflective of electromagnetic energy in the optical spectrum.

3. The BSA of claim 1, wherein the cover proximal surface has an absorptance of at least 90%.

4. The BSA of claim 1, wherein the cover proximal surface includes a cover proximal surface coating comprised of a material which is highly absorptive of electromagnetic energy in the optical spectrum.

5. The BSA of claim 1, wherein the baffle cover is configured to function as a thermal sink for the shutter system by absorbing electromagnetic energy in the optical spectrum which has been reflected from door distal surface.

6. The BSA of claim 5, wherein the baffle cover is comprised of a polymer or composite material having a Tg value of at least 500° F.

7. The BSA of claim 6, wherein the baffle cover is comprised of a cyanate ester.

8. The BSA according to claim 6, wherein one or more of the tubular member, the shutter panel and the door are comprised of the polymer or the composite material.

9. The BSA according to claim 5, wherein the baffle cover is thermally coupled to the tubular member at the distal end of the tubular member.

10. The BSA according to claim 1, wherein the baffle cover has a cover distal surface which faces away from the shutter system and has a cover reflective coating which is highly reflective of electromagnetic energy in the optical spectrum.

11. The BSA according to claim 1, further comprising a second cover aperture, a second shutter aperture extending through the shutter panel aligned with the second cover aperture, and a second door movable between the open and closed position.

12. A method for managing thermal energy in a baffle and shutter assembly (BSA), comprising:
receiving electromagnetic energy in the optical spectrum at a baffle defined by a tubular member having a proximal end, a distal end, and a lumen extending therethrough along a central axis;
limiting the entry of the electromagnetic energy into the lumen by using a baffle cover disposed at the distal end of the tubular member and extending across a major aperture defined by the lumen, and having a cover aperture in the baffle cover which is smaller in diameter as compared to the major aperture;
controlling an amount of light that is allowed to pass through the lumen from the distal end of the tubular member to the proximal end of the tubular member by using a shutter system disposed within the lumen intermediate of the proximal end and the distal end, the shutter system comprising a shutter panel extending across the major aperture, a shutter aperture extending through the shutter panel, and a door movable between a closed condition in which the door is positioned to prevent light from passing through the shutter aperture, to an open condition in which the door is positioned to permit light to pass through the shutter aperture; and
using a highly reflective distal surface of the door which faces a proximal surface of the baffle cover when the door is in the closed condition to reflect incident electromagnetic energy in the optical spectrum towards the proximal surface of the baffle cover which is highly absorptive of the incident electromagnetic energy, whereby the incident electromagnetic energy is substantially absorbed by the baffle cover instead of the shutter system.

\* \* \* \* \*